United States Patent [19]

Steinhauer et al.

[11] Patent Number: 4,763,862
[45] Date of Patent: Aug. 16, 1988

[54] FLAP DRIVE SYSTEM FOR AIR FOILS

[75] Inventors: Hans-Juergen Steinhauer; Walter Martens, both of Delmenhorst, Fed. Rep. of Germany

[73] Assignee: MBB GmbH, Bremen, Fed. Rep. of Germany

[21] Appl. No.: 877,106

[22] Filed: Jun. 23, 1986

[30] Foreign Application Priority Data

Jun. 22, 1985 [DE] Fed. Rep. of Germany ....... 3522448

[51] Int. Cl.⁴ .............................................. B64C 9/06
[52] U.S. Cl. .................... 244/215; 244/213
[58] Field of Search ............... 244/211, 212, 213, 214, 244/215, 219, 178, 225, 90 R

[56] References Cited

U.S. PATENT DOCUMENTS

| | | | |
|---|---|---|---|
| 3,987,983 | 10/1976 | Cole | 244/219 |
| 4,312,486 | 1/1982 | McKinney | 244/219 |
| 4,381,093 | 4/1983 | Rudolph | 244/219 |
| 4,544,118 | 10/1985 | Robinson | 244/90 R |

FOREIGN PATENT DOCUMENTS

3133961 4/1983 Fed. Rep. of Germany ...... 244/213

Primary Examiner—Joseph F. Peters, Jr.
Assistant Examiner—Rodney Corl
Attorney, Agent, or Firm—Ralf H. Siegemund

[57] ABSTRACT

A flap is pivotally mounted on a roller that runs in a track; a three point control lever has one point connected to the roller, a second point to the front of the flap, and a third point is variably connected to a turning lever that drives the flap. The variation is obtained either by providing a secondary lever on the turning lever to obtain a cycloidal path, or a spindel drive just varies the distance between the third point of the control lever and the axis of the turning lever. The turning lever is hollow to accommodate the drive elements for the third point variation.

10 Claims, 6 Drawing Sheets

FIG.8

FLAP DRIVE SYSTEM FOR AIR FOILS

BACKGROUND OF THE INVENTION

The present invention relates to the driving and guiding of a trailing edge flap in aircraft wings, particularly the trailing edge flap of a transsonic wing for commercial aircraft, whereby particularly the camber of the wing is to be changed during flight for improving aerodynamic effectiveness.

Basically, the camber change of an aircraft wing under utilization of a flap requires a combined load carrying and guiding rail system for the flap as well as an adjusting drive connected to that flap through suitable linkage. The protraction and retraction of wing flaps, such as the trailing edge flap is a field of long standing. These flaps serve as auxiliary high performance lifting device and become effective during landing and take-off. Here one employs a so-called rail kinematics by means of which the flaps are retracted and pro-tracted along a well defined path. During cruising these flaps are completely retracted such that they function as trailing edge completing structure for the wing, the are aerodynamically fully incorporated in the wing's contour.

German printed patent application No. 3,114,143 proposes optimization of cruising, particularly of commercial aircraft having transsonic wings, by means of changing the camber of the wing corresponding to the respective current flight condition as evidenced by weight, altitude, and velocity. The camber change is obtained, for example, by using the flap and spoiler system which, as stated, is normally used only during low velocity phases as well as during maneuvering but not during regular cruising.

DESCRIPTION OF THE INVENTION

It is an object of the present invention to improve the flap system, particularly the operation of the rear or trailing edge flap or flaps as to driving and guiding such that these flaps become better suitable for changing the camber of the wing during cruising without, however, losing their primary function during take-off and landing phases.

In accordance with the preferred embodiment of the present invention, it is suggested to provide load carrying and guiding rails for such a flap in a manner known per se; to pivot the flap on guiding structure that runs on these rails and to connect the flap with a pivot turning and driving lever via a control lever having one point connected to the flap at a defined spacing from the flap's turning axis that moves on the rails, whereby the pivot lever is connected for being rotated by the moving output of the flap drive, while the disposition of the free end of the turning lever is variably connected to a second point of the control lever, is variation being in relation to the turning axis of the flap. Thirdly, the control lever is also pivotally connected to the guiding structure, such as rollers by means of which the flap is pivotally guided on the rails.

The invention structure makes it possible to have the flap to pivot or rotate within a particular angular range even when the flap is and, basically, remains retracted so that it is not necessary to protract or extend the flap for purposes of obtaining a camber change during cruising. The resulting translatory movement of the flap during pivoting is comparatively small so that undesired gaps will not form particularly during cruising which, in turn, means that the favorable flow pattern across the wing during a relative high speed cruising is not interfered with.

In furtherance of the invention it is proposed to mutually match the track contour of the carrying and guiding rails and the track path undergone by the movable fastening point of the turning lever to thereby ensure optimum compensation of the contours involved without encountering any interference upon the desired camber changes.

The variable connection between the drive and turning lever and the control lever is effected either through a secondary lever such that upon rotation of the turning lever the end of the secondary lever undergoes a cycloidic path. Alternatively, the control lever is linked to the turning lever by a device (e.g. a spindel drive) that changes just the length of the distance of the connect point to the axis of the turning and drive lever. Either mode of connection establishes, basically, two control ranges; in one range of angular deflection of the turning lever there is little protraction of the flap but substantially only pivoting so that the flap adjustment is effective as change in the camber. In the second range, protraction (or retraction) prevails. Both ranges are contiguous, i.e. they merge with smooth transition in-between.

DESCRIPTION OF THE DRAWINGS

While the specification concludes with claims particularly pointing out and distinctly claiming the subject matter which is regarded as the invention, it is believed that the invention, the objects, and features of the invention, and further objects, features and advantages thereof will be better understood from the following description taken in connection with the accompanying drawings, in which:

Figure 1:
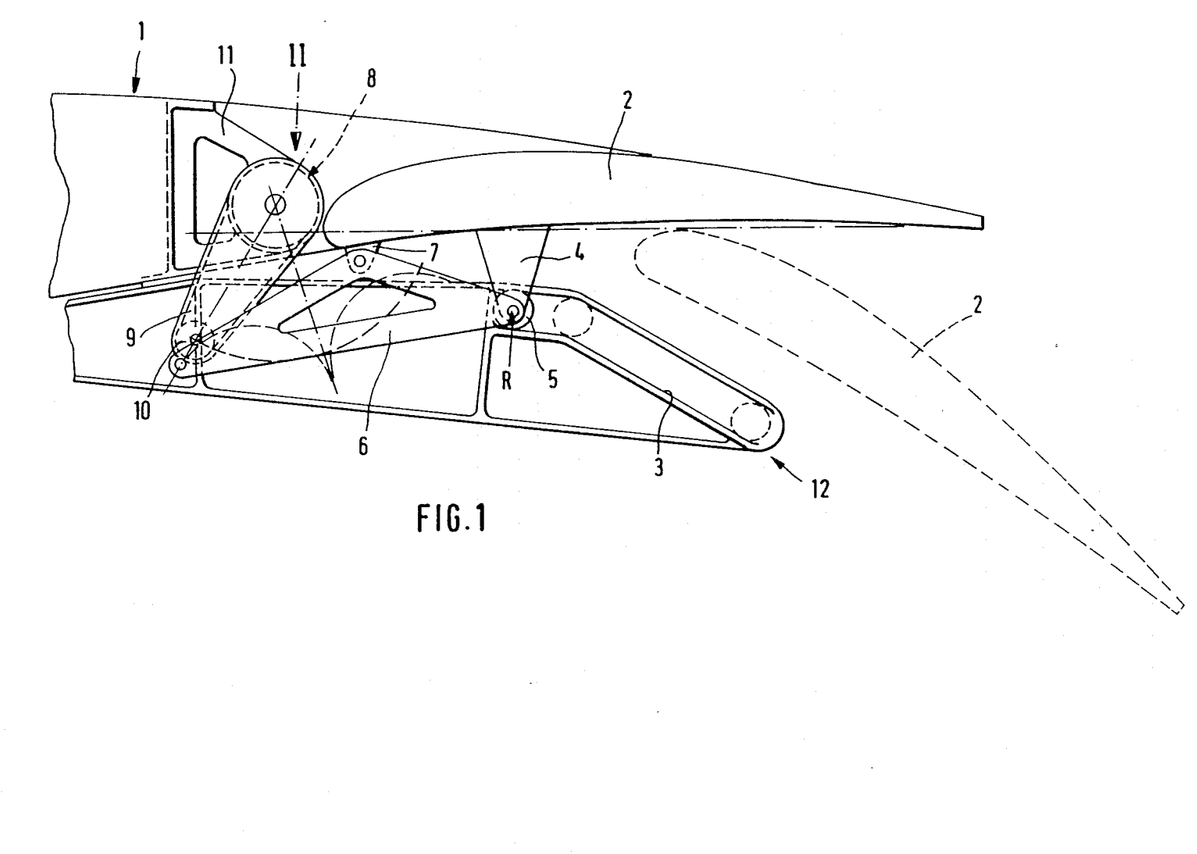
FIG. 1 is a partial section and side view of a rear portion of a wing showing a first example of the preferred embodiment of the present invention for practicing the best mode thereof, drive and guiding structures are shown somewhat schematically.

Proceeding to the detailed description of the drawings FIG. 1 illustrates, as stated, a first example of the preferred embodiment, illustrating particularly a section through the trailing edge area of a transsonic wing of a commercial aircraft. The structure of the wing 1 is shown to some extent only, and a trailing edge flap 2 is arranged in the rear portion of the box of wing 1. Flap 2 is associated with a drive and guiding system which is essentially comprised of the following components:

Two combined load carrying and guide rails 3 are disposed and associated to both sides of the flap 2, only one of these rails is shown, and they receive in each instance a support wheel or pulley 5 being connected to flap 2 through a projection 4. Thus, connection or journalling establishes a pivot point R.

Figure 2:
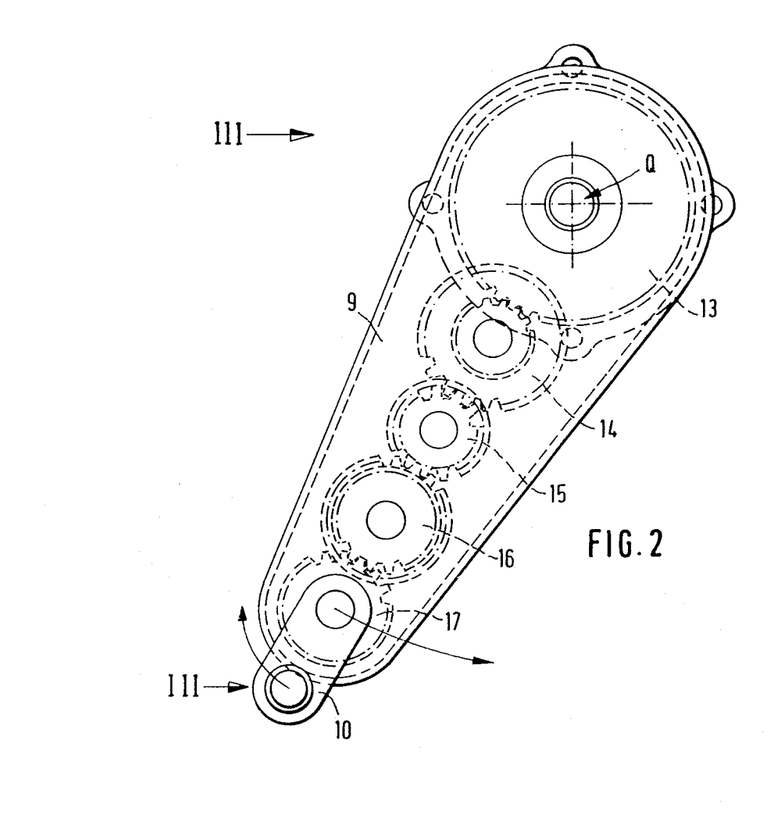
FIG. 2 is a construction detail of the arrangement shown in FIG. 1.
Figure 3:
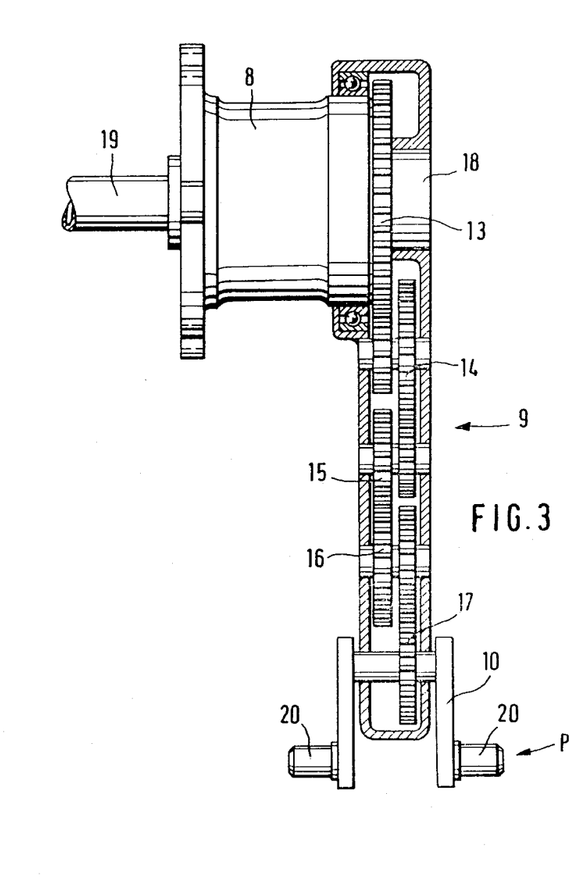
FIG. 3 is front view of the device shown in FIG. 2.

The guide rails 3 have two linear portions arranged in relation to each other by the shallow or flat angle. A control lever constructed as a triangular linking and guiding element 6 is provided and linked in a first point to the turning axis of the support wheel 5. In addition, the lever 6 is articulated through a second projection 7 on the flap 2. An adjustment drive 8 is housed in wing box 1 and positively connected to the flap 2 as follows. A turning, pivoting, and drive lever 9 has one end secured by means of flanges to the output shaft of the adjusting drive 8. The other (free) end of the lever 6 is connected to the third point of triangular lever 6, via secondary second lever 10. Lever 10 is pivotably or rotatably mounted to the free end of the lever 9. On turning of lever 9, a secondary motion is imparted upon lever 10 such that the free end of the lever undergoes a cycloidal motion, to be produced as follows:

The adjusting drive 8 is connected to the interior of the structure of wing 1 by means of holding structure 11. The guide rails 3 are arranged in a separate housing or casing 12 being connected to and disposed underneath the wing 1. Certain details of the device shown in FIG. 1 are more readily descernible from FIGS. 2 and 3. These figures show particularly that the lever 9 is hollow and in its interior a gear train is disposed which includes five intermeshing gears 13, 14, 15, 16, and 17. The first gear, 13 of this train, is secured to the casing of the drive 8. The drive 8 is also constructed as a gear, and is arranged concentrically to an output shaft 18. Therewith concentricity obtains between the gear 13 and the turning axis of this lever 9. A drive motor (which is not shown) drives the input shaft 19 of the gear portion 8. On the other hand, the output gear 17, which is the last one of this train 13 through 17, is arranged on the turning axis of the secondary lever 10 and is, in fact, secured thereto. The axes of levers 9 and 10 run in parallel. Thus, as the shaft 18 turns lever 9, gear 14 meshing gear 13 rotates and this rotation is transmitted to turn lever 10. This motion, in turn, is thereby transmitted through the outer end of this lever 10 to the journal pins 20 and from there upon the triangular control lever 6. The latter, in turn, transmits this motion upon the flap 2 by pivoting about axis R. It can also be seen that in a given plane the direction of rotation of the two levers 9 and 10 is an opposite one.

Figure 4:
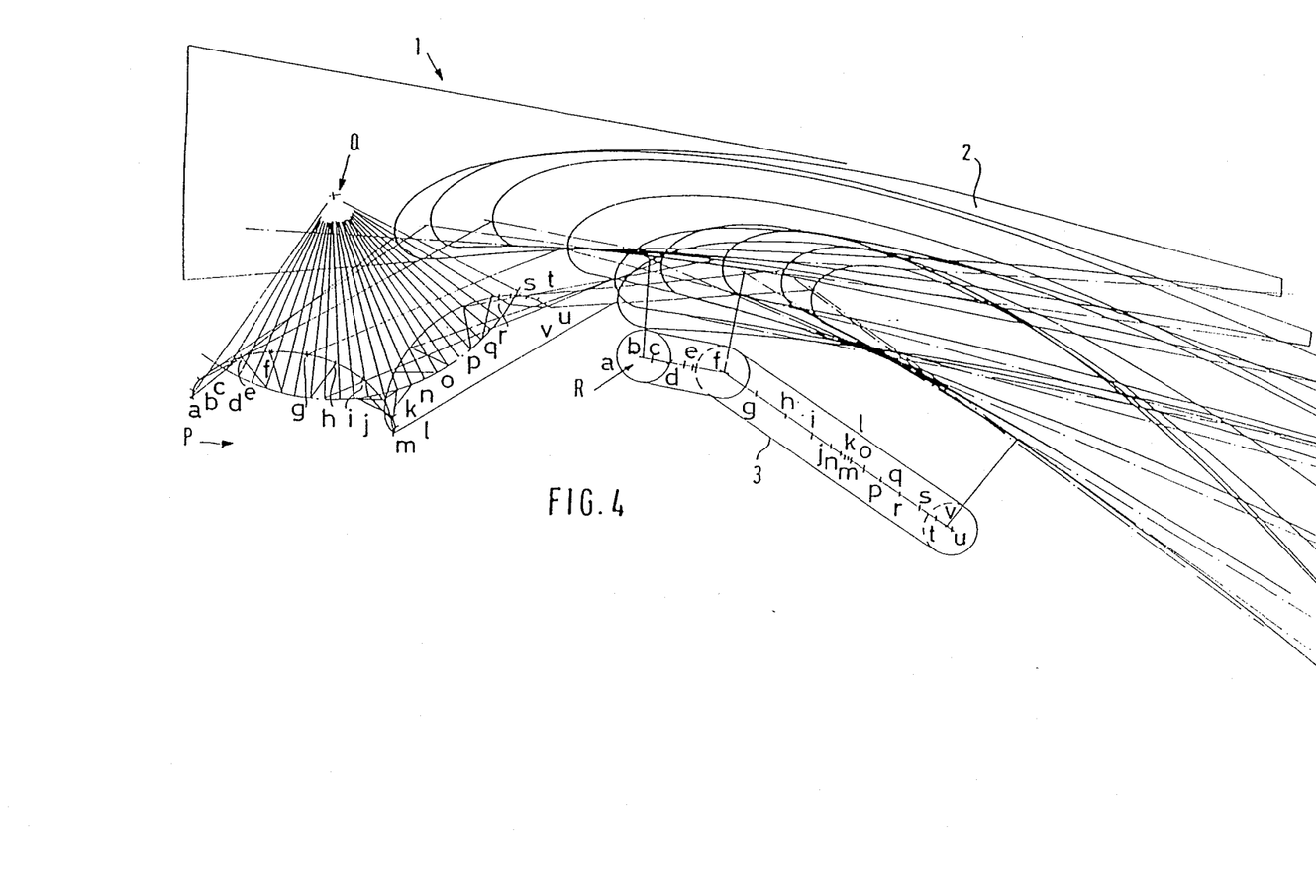
FIG. 4 is an illustration of kinematic occurrences of and within the structure shown in FIG. 1.
Figure 5:
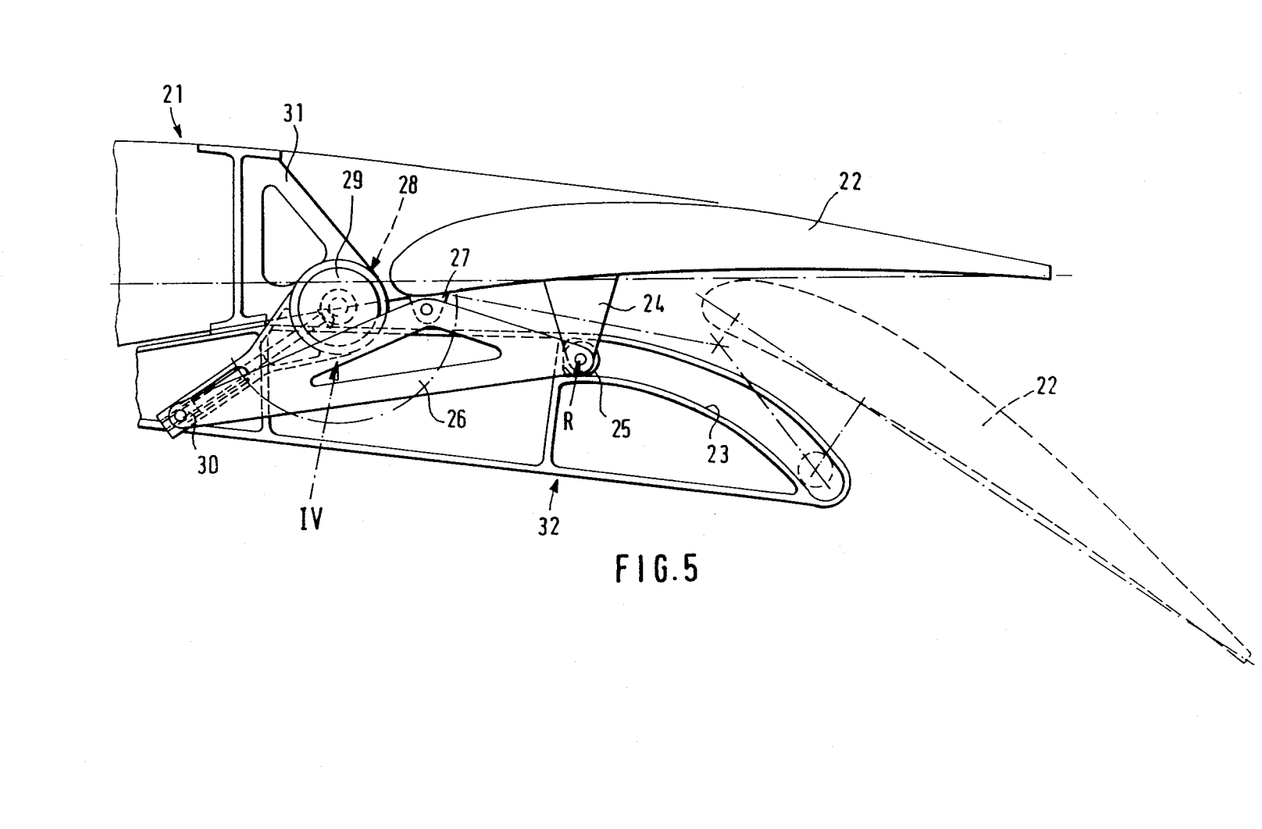
FIG. 5 is a view similar to FIG. 1 but showing a second example of the preferred embodiment of the present invention.

After having described the basic mechanical aspects involved in the transmission of motion between adjusting drive (19, 18) and flap 2, reference is now made to FIG. 4 which illustrates various phases in the kinematics involved when the flap is being moved. The individual phases of motion involve particularly the range between fully protracted and fully retracted state of the flap 2. The various phases are indicated in small latin letters in the drawing. The left-hand portion of FIG. 4 illustrates a cycloidal track and curve in representation of the travel path of the point P. This point P represents the position of the center axis of the pins 20. The lower right-hand portion of FIG. 4 illustrates the rail a track 3 and a center line therein represents the various positions of the turning axis R of support wheel 5 during the various phases whereby the letters here correspond to the points of the cycloid curve in the left-hand portion of FIG. 4. Finally the letter Q denotes the position of the turning axis of the gear output shaft 18 (turning axis of lever 9) which is, of course, invariable.

As can be seen from this representation there is a positive and reversible connection on one hand between the adjusting motion of gear 8 and its output shaft 18, and on the other hand the rotation of the second lever 10. This positive connection is provided by the gear train 13 through 17 and establishes a modulation of the position of the end point as well as of the effective length of the turning lever 9 as a dombined result of pivot motion of the two levers 9 and 10. The lengths of the two levers 9 and 10 are related in accordance with the desired modulation amplitude which the point P is supposed to undergo, whereby the differential angle between lever 9 and the housing or casing of gear 8 is utilized through the revolving of the gear 14 upon and around the gear 13 which is secured to the casing of gear 8 as stated. This, in turn, results in a suitable translation of such motion into a turning motion of the second lever 10. The lever 9, of course, serves as a housing or casing for the gears 13 through 17 which provides and establishes the requisite stiffness of the arrangement and also protects these gears against damage, soil, etc.

The translation of the angular path of the lever 9 as well as of the length of the two levers 9 and 10 is chosen so that the track of point P for a total rotation of the lever 10 by 720 degrees (lever 9 pivoting by a little over 90 degrees) establishes a cycloid track which is composed of two segments. These two segments together establish three corner or end points a, m, and v, respectively, corresponding to flap positions: fully retracted, starting position, landing position.

FIG. 4 also illustrates somewhat schematically the various positions of the trailing edge flap 2 and how they relate to the various phases a through v. The inventive arrangement establishes that in the first phase the turning motion of the adjusting drive-gear 8 concurs with only a very small translation of the flap 2 so that in relation to the original profile of the wing 1, as geometrically continued by the flap, there is little translatory movement of the flap while the flap undergoes a rotational movement over the desired and prescribed angular range. In this way one obtains a particular camber change of the wing. In the later phases the flap is simply controlled in a normal fashion as a take-off and landing assist device.

The particular example shown in FIGS. 5 through 8 is likewise related to a trailing edge flap system for transsonic wings. This instance likewise provides for cooperation with a wing 21, having a trailing edge flap 22 being mounted and held in the combined carrying and guiding rails 23 for movement about the turning axis R. Guiding of the flap 22 is, in this case, established through a continuously curved rail track contour. Thus, as in the earlier embodiment, there is a support wheel 25 on a projection 24 of the flap 22. Also, a triangular lever 26, a second extension 27, and an adjusting and positioning drive 28 (gear) as well as a lever 29 actuated and moved by the output of that gear drive 28, is comparable to components of similar descriptive designation introduced above with reference to FIGS. 1 through 4. (The reference numerals differ by "20"). However, in deviation from that first example, a secondary lever rotatably linked to the first mentioned lever, is not used here. Rather, in the present example, a slide element 30 is mounted for longitudinal sliding, is a suitable channel or duct at the end of the lever 29, facing away from the gear 28. A roller and support structure 31 for the gear 28 as well as a casing 32 for receiving the rail 23 on the other hand are also elements which correspond basically similarly designated elements in the embodiment shown in FIGS. 1 through 4.

Figure 6:
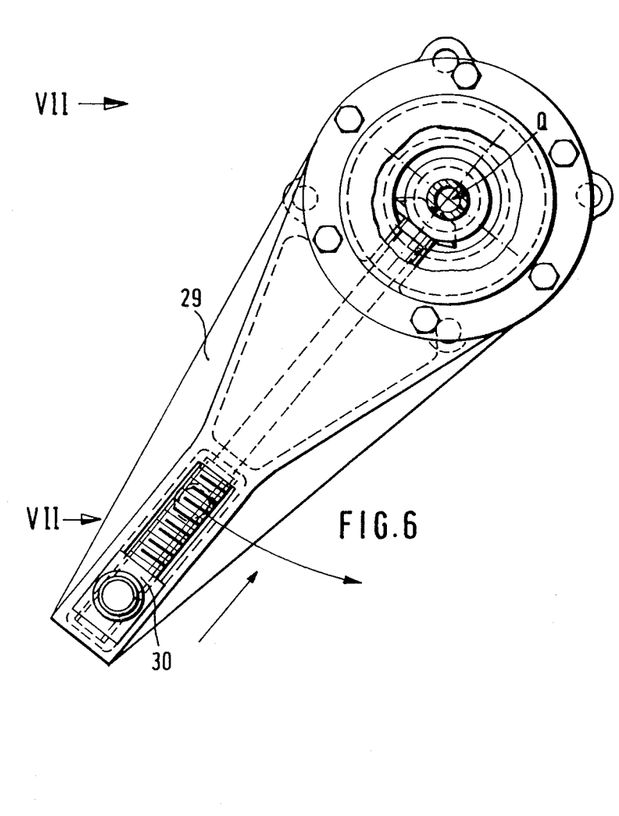
FIG. 6 is a detail of the structure shown in FIG. 5 bearing the same relation to FIG. 5 as FIG. 2 has to FIG. 1.
Figure 7:
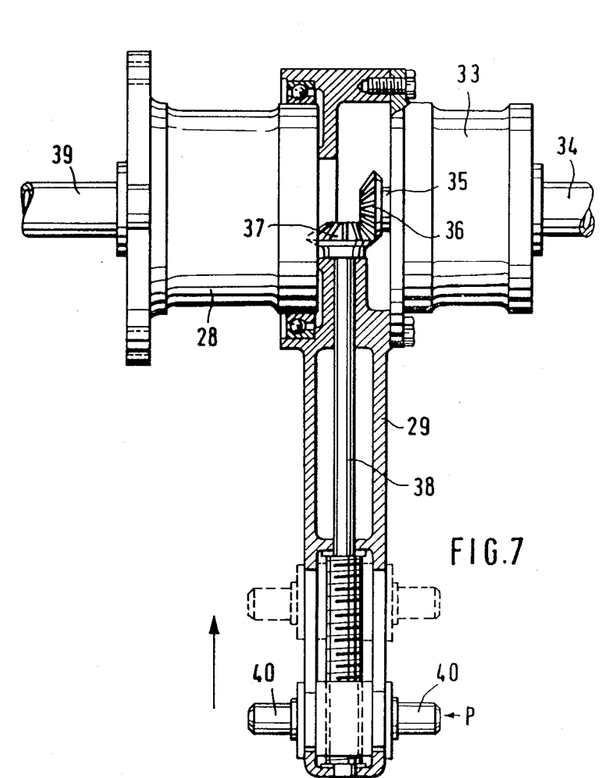
FIG. 7 is a side view of the device shown in FIG. 6.

Various details in the construction of the turning lever 29, including the means for the length variation as well as the various drive components are shown in FIGS. 6 and 7. The adjusting drive for the turning lever 29 is again established by a gear 28 with an input shaft 39. However, gear 33 is associated therewith having an input shaft 34. The gear 33 is flanged immediately and directly to the casing of the lever 29. A bevel gear 36 sits on the gear output shaft 35 of this second gear 33 and meshes a second bevel gear 37. The two bevel gears are arranged at a 90 degree angle to each other. The gear 37, in turn, drives a spindle 38 which meshes a spindle nut-like threading of the glide element 30.

The glide element 30 has two opposing outer surfaces and carries drive shafts or pins 40. The glide element 30 particularly is guided by and in two oblong slots 41 and 42 of the hollow turning lever 29. This way, longitudinal motion of the glide element 30 permitted. The shaft 40 establishes a positive force transmitting connection to the triangular lever 26. Lever 26 transmits the motion of the gear 28 being driven by a motor (not shown) with output shaft 39 upon the trailing edge flap 22.

Figure 8:
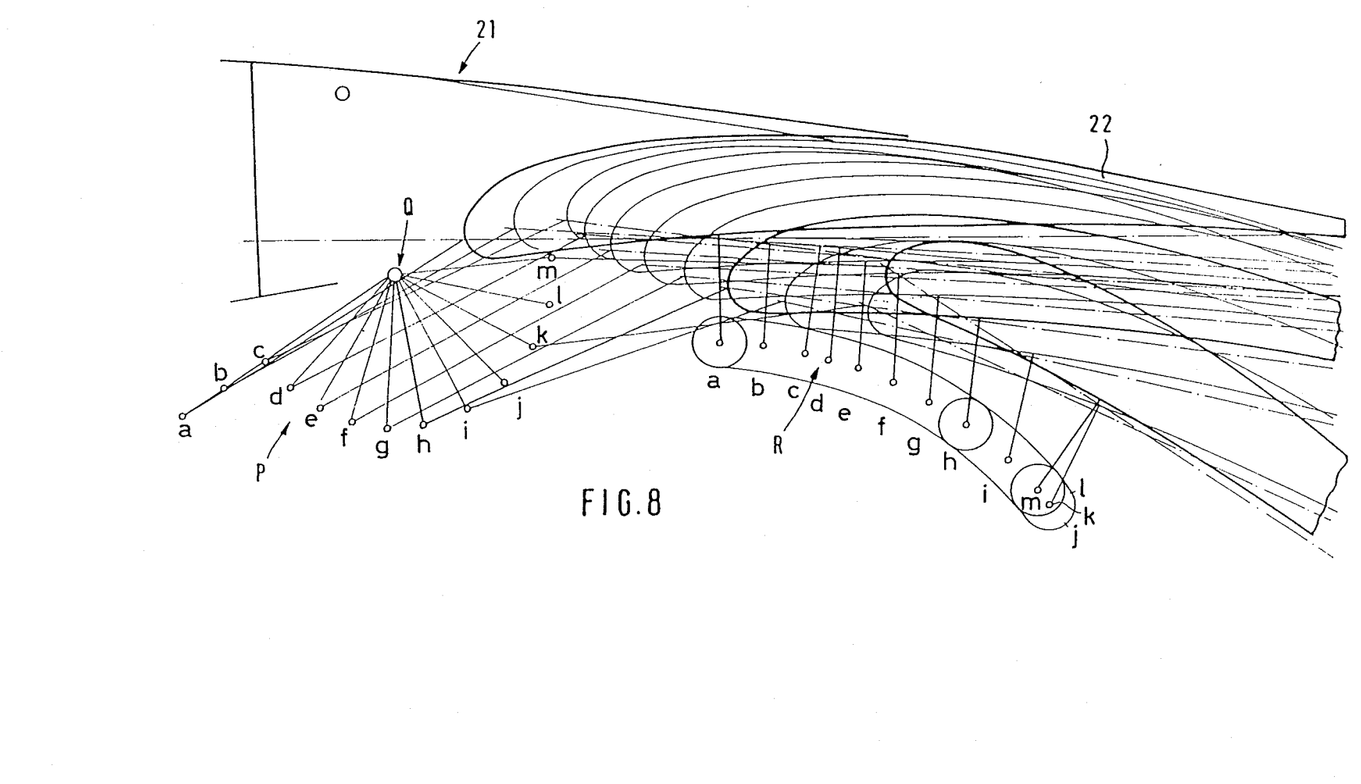
FIG. 8 is the kinematic companion shown for the device shown in FIGS. 5 through 7 and resembling FIG. 4 in that regard.

The function of this second example of the preferred embodiment of the invention as well as certain constructive features as they have been mentioned, result in a track of points P and R which are depicted in FIG. 8. The point P is again the location of the center axis of the pins 40, and R, in this case, is analogously the point of the location of the axis of support wheels 25, being the pivot point for the flap 22. Also, this figure depicts various phases and motion, and particularly corresponding positions are again indicated in small latin letters, running, in this case, from a to m.

As can be seen from FIG. 8, the motion of the entire drive system is again composed of two superimposed components of movements. Through operation of the second gear 33 (by a not illustrated separate drive) an independent linear movement of the point P obtains on the lever 29. In principle, this movement is independent from the turning and swivel movement of lever 29, so that a greater degree of freedom and track composition is available. The motion of the point P begins from an outer position and runs towards the center Q without pivot motion of lever 29. These motion phases are represented by small letters a, b, and c. Accordingly, flap 22 just rotates, whereby again any additional translatory movement is very small. Also here, there is hardly any tendency for the formation of a gap between the end of the wing box and the nose of the flap. Such a gap, if it materializes, could interfer with the flow pattern across the wing during high speed cruising. On the other hand, this motion is very suitable to change the camber and curvature of the wing, particularly during cruising.

Whenever the gear 33 does not turn, the main gear 28, i.e. the adjusting drive for the lever 29, is actuated, and this, in turn, results in a movement of the point P along a circularly curved path and the point R then moves analogously along the path as established by the contour of the rail 23. This motion, in turn, is translated into a translatory motion of the flap 22 to concur with some rotation about R. In this case, then, a gap obtains between the rear end of the wing box and the nose of the flap. This gap, of course, is desired and is part of the operation of flap extention during landing and take-off phases.

Finally, one can see that both drives may be operated simultaneously which is not shown in FIG. 8, but it is readily understandable that now a composite motion is obtained resulting in various different flap positions which kinematically could be composed out of the individual positions for separate drive operations as described. This then establishes a multitude of additional flap positions and adds to the flexibility of the system.

The inventive drive and guide arrangement is not limited to the particular kind of flap system as illustrated. In other words, the inventive concept is not just applicable to trailing edge flap systems, but it can readily be seen that in an analogous fashion the leading edge flap or slab of an aircraft wing can be actuated to obtain regular protection in case of a landing and take-off assist situation or just pivotal change for purposes of changing the curvature of the camber line, to occur now in the front part of the nose. This, of course, ultimately leads to the possibility of having both leading and trailing edges systems constructed in the manner that follows the principles of the invention, thereby obtaining a still larger degree of versatility that is developed primarily in conjunction with transsonic wings but other types of wings can be improved analogously.

The invention is not limited to the embodiments described above; but all changes and modifications thereof, not constituting departures from the spirit and scope of the invention, are intended to be included.

We claim:

1. Drive and guiding system for a flap arranged on a wing of an aircraft for use as high lift flap during landing and take off and as camber control flap during cruising, there being a combined load carrying and guiding rail system provided, there being further provided a drive for obtaining protraction and retraction of the flap, the improvement comprising:

means for mounting and holding said flap in said rail system for movement in the rail system and for rotation in relation thereto;

a three point control lever of invariable geometry and having a first connect point being linked to said flap and a second connect point being linked to said holding means by means of which the flap is held in said rails;

a crank like turning lever connected for being rotated by said drive and having one end connected to a third point being a pivot point of said three point control lever at a point that is variable in relation to the turning axis of said turning lever and in its distance from an axis of the turning lever; and a drive means other than the turning lever itself and the control lever and connected for obtaining the variation of the point on the control lever in relation to the turning axis.

2. Device as in claim 1 wherein said control lever is of triangular configuration.

3. The improvement as in claim 1 wherein said variation is obtained through means superimposing a second rotational movement as derived from the rotational movement of said turning lever and having an opposite sense of rotation.

4. The improvement as in claim 3 said turning lever having its free end connected to a second lever mounted thereto for rotation, axes of rotation for the two levers being approximately parallel, said second lever having its free end connected to said three-point control lever.

5. The improvement as in claim 4 including a gear train for driving the connection of the turning lever to the second lever.

6. The improvement as in claim 5 wherein said turning lever is hollow to serve as casing for said gear train.

7. The improvement as in claim 1 wherein the end of said turning lever is connected with means establishing a cycloidal two-segment movement for an arc covering approximately one third of a circle.

8. The improvement as in claim 1 wherein means are provided at the end of said turning lever translating movement of the turning lever into a radial translatory motion.

9. The improvement as in claim 8 wherein said turning lever is being hollow, there being a spindle drive with guide means geared to said hollow lever for obtaining said translatory motion.

10. The improvement as in claim 9 wherein said motion is obtained through a second drive means for obtaining said variation.

* * * * *